Figure 1:
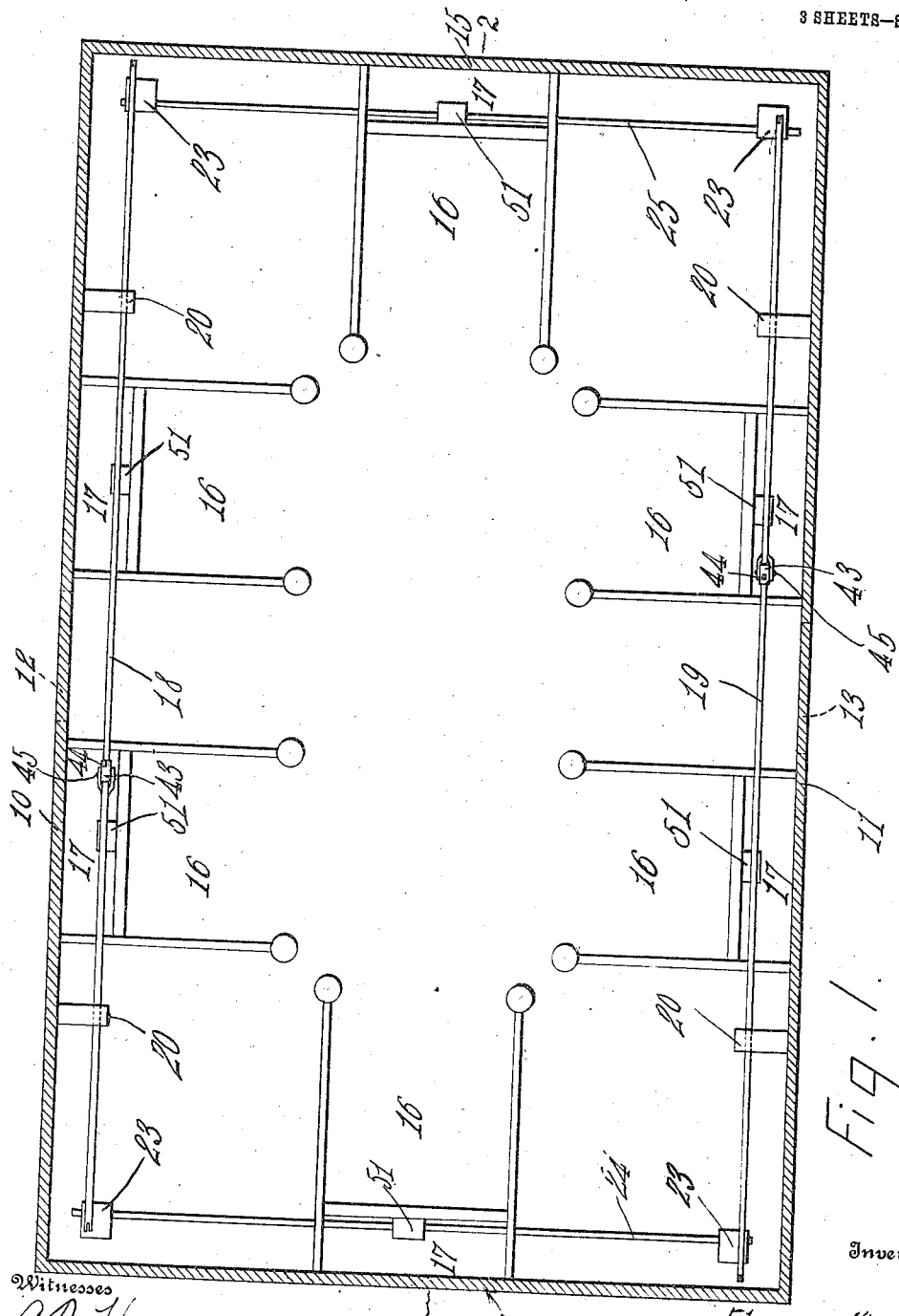

E. KLEMETSON.
HITCHING DEVICE FOR STOCK.
APPLICATION FILED JUNE 11, 1909.

949,038.

Patented Feb. 15, 1910.
3 SHEETS—SHEET 1.

Witnesses
C. R. Hardy
C. N. Woodward

Inventor
Eleser Klemetson
By Chandler & Chandler
Attorneys

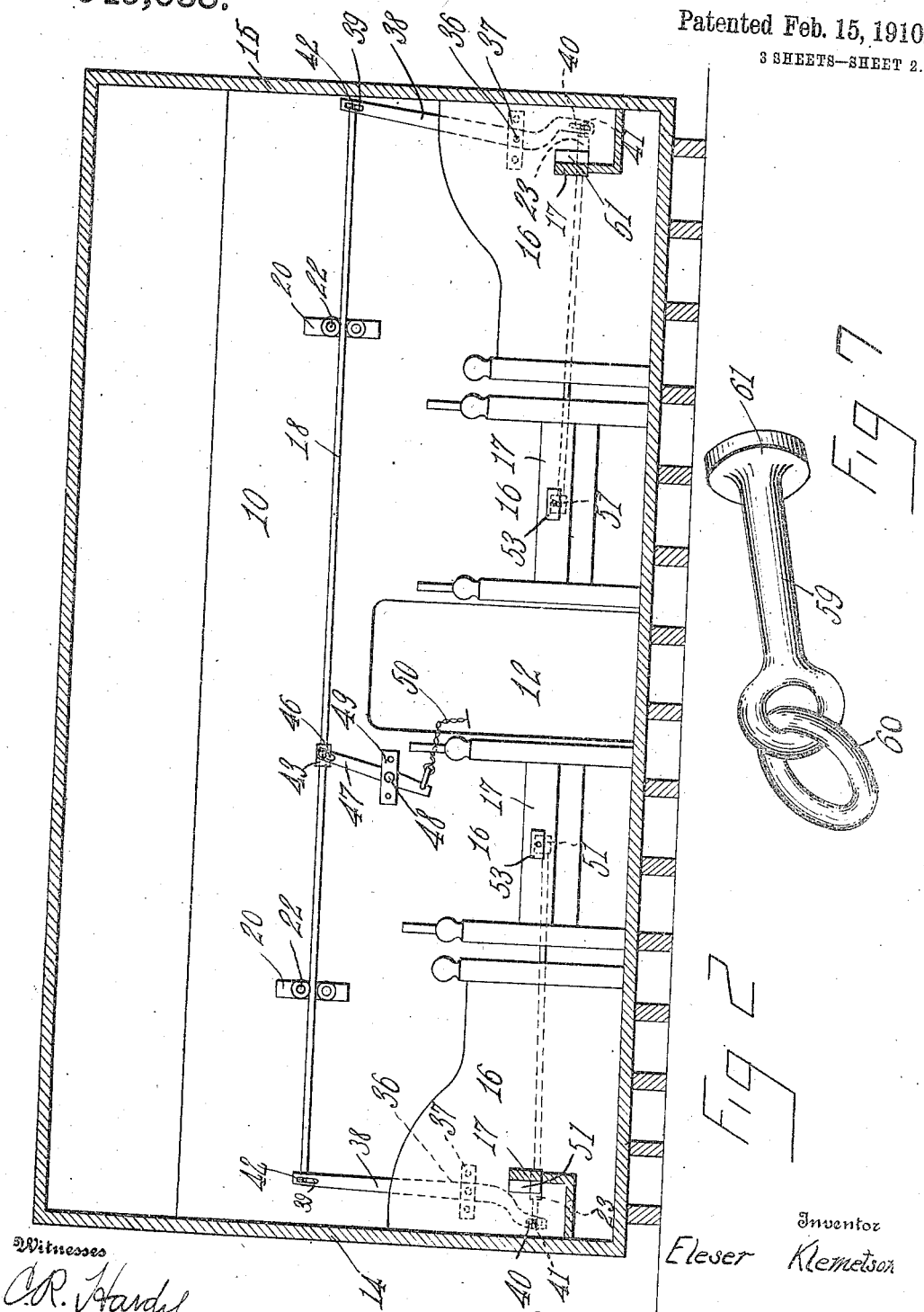

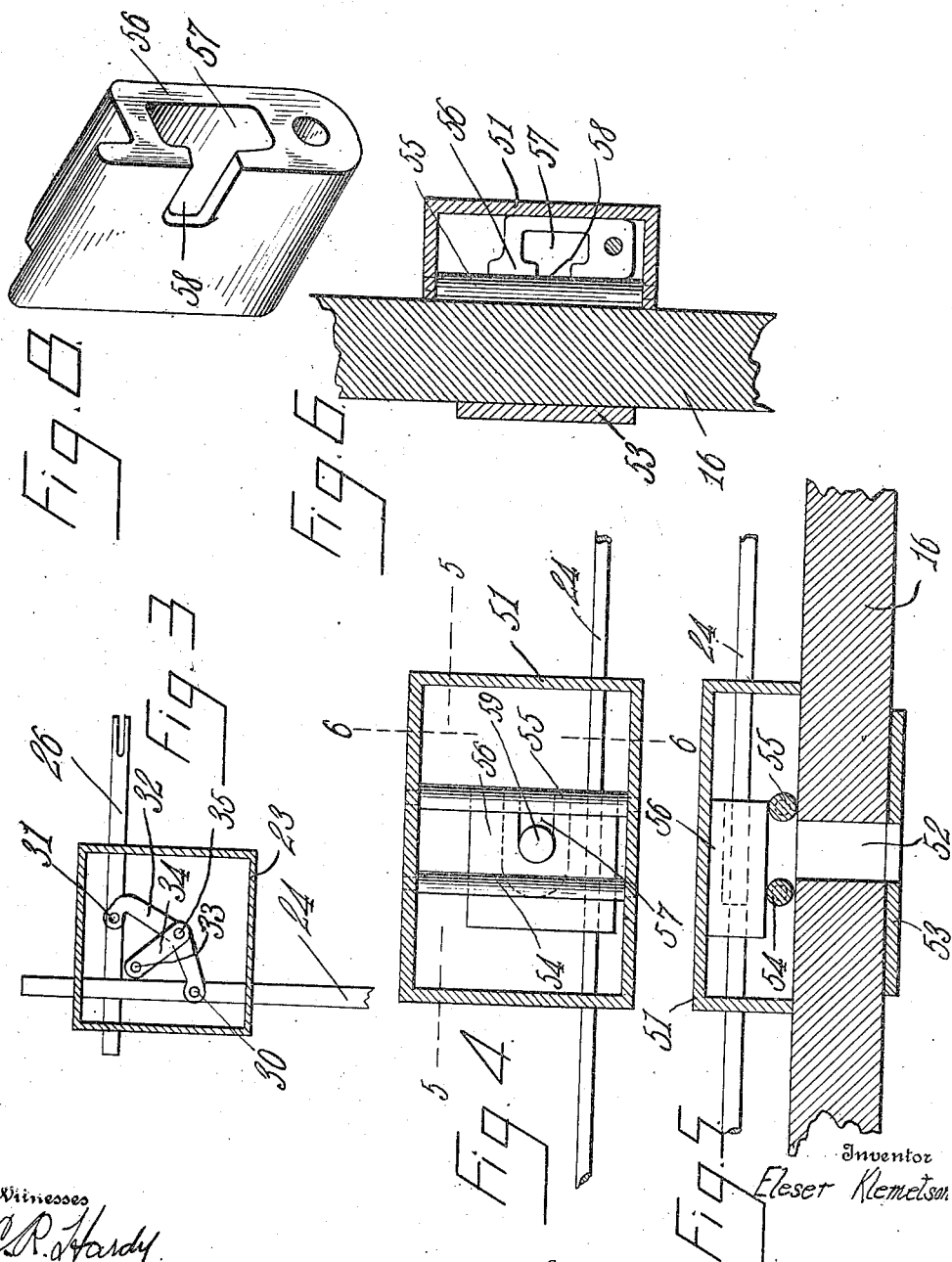

UNITED STATES PATENT OFFICE.

ELESER KLEMETSON, OF HENNING, MINNESOTA.

HITCHING DEVICE FOR STOCK.

949,038.  Specification of Letters Patent.  Patented Feb. 15, 1910.

Application filed June 11, 1909. Serial No. 501,591.

*To all whom it may concern:*

Be it known that I, ELESER KLEMETSON, a citizen of the United States, residing at Henning, in the county of Ottertail, State of Minnesota, have invented certain new and useful Improvements in Hitching Devices for Stock; and I do hereby declare the following to be a full, clear, and exact description of the invention, such as will enable others skilled in the art to which it appertains to make and use the same.

This invention relates to devices for instantly releasing stock from stables, more particularly in event of fire, and has for one of its objects to improve the construction and increase the efficiency and utility of devices of this character.

Another object of the invention is to provide a simply constructed device capable of enlargement to a practically unlimited extent to adapt the device to any required number of stalls, or to a stable containing any number of animals, with means for hitching each animal separately, and to instantly release all of the animals simultaneously when required from a location preferably externally of the stable.

With these and other objects in view, the invention consists in certain novel features of construction as hereafter shown and described and then specifically pointed out in the claims.

The improved device may be applied as above stated, to a stable arranged with any required number of stalls, and to stalls arranged in any relative order, and for the purpose of illustration is shown applied to a stable having six stalls, two on each side and one at each end. This arrangement of the stalls enables the operation of the improved device to be illustrated completely, and in the drawings thus employed.

Figure 1 is a plan view of the stable with the walls in section, illustrating the arrangement of the improved releasing devices. Fig. 2 is a section on the line 2—2 of Fig. 1. Fig. 3 is a sectional view of one of the devices for coupling the operating rods. Fig. 4 is a sectional elevation viewed from the interior side of the hitching mechanism. Fig. 5 is a section on the line 5—5 of Fig. 4. Fig. 6 is a section on the line 6—6 of Fig. 4. Fig. 7 is a perspective view enlarged, of one of the hitching pins. Fig. 8 is a perspective view, enlarged, of the sliding locking block.

The stable portion of the improved device comprises the side walls 10—11 having doors 12—13 therein and end walls 14—15, with stable divisions indicated at 16, whereby six stalls are shown with their mangers 17. Mounted for longitudinal movement along the side walls 10—11 of the stable structure, preferably above the doors are rods 18—19, the rods being supported by hangers 20 having anti-friction rollers 22, so that the friction is reduced to a minimum.

Located in each corner of the stable structure is a casing 23, the casings being designed to contain the mechanism whereby the various releasing devices are coupled for operation. All of the casings 23 and the mechanism contained therein are precisely alike and the description of one will suffice for all. Slidably arranged through the casings at one end of the stable structure is a rod 24, while a similar rod 25 extends through the casings at the opposite end of the barn structure, the rods 24—25 being arranged in parallel relations to the end walls of the barn. Extending through the casings 23 are other rods 26. The latter series of rods extend inwardly toward the door-way openings 12—13 and through the mangers 17 of the stalls which are located at the sides of the barn structure, while the rods 24—25 project through the mangers or stalls at the ends of the barn structure. The several rods 24—25—26 are located close to the inner vertical wall of the manger, so as not to interfere with the feeding of the animals, as hereafter explained. Within each of the casings 23 is located a coupling means whereby the reciprocating movement of any one of the rods will be communicated to all of the other rods, and this coupling mechanism is represented in Fig. 3, which represents a section of one of the casings 23 enlarged. For illustration the casing 23 through which the rods 24—26 pass is selected, and in Fig. 3 the rods 24—26 are shown crossing each other near one corner of the casing. Pivoted at its terminals at 30—31 respectively to the rods 24—26 is a lever arm 32, the lever arm extending diagonally within the casing 23. Mounted to swing at 33 within the casing is a link 34, with the free end of the link pivoted at 35 centrally to the lever arm 32. By this simple means the longitudinal movement applied to either one of the rods 26 will cause the other rod to also move longitudinally, as will be obvious.

Each of the casings will be provided with a set of the lever arms and its link. By this arrangement it will be obvious that reciprocating movement applied to any one of the rods will be communicated to all of the remaining rods. The upper longitudinal rods 18—19 are designed to be utilized to transmit motion to the various rods which extend through the various mangers, and one of these coupling means will be located adjacent to each of the casings 23. These latter coupling means are substantially alike and the description of one will suffice for all.

Pivoted at 36 to brackets 37 connected to the side walls of the stable are lever arms 38, the lever arms having longitudinal slots 39—40 at their ends. The terminals of the rods 26—27—28—29 are coupled by pins 41 respectively to the several slots 40 of the arms 38, while the terminals of the rods 18—19 are likewise coupled by pins 42 to the slots 39 of the lever arms 38. By this means reciprocating movement applied to either of the rods 18—19 will be communicated to all of the lower rods, as will be understood. The rods 18—19 are provided with suitable operating mechanism, and this operating means will be located at any desired point relative to the stable, but preferably near the doors 12—13, so as to be readily accessible to the attendant, and for the purpose of illustration two of these operating devices are thus shown, and as they are precisely alike, the description of one will suffice for both.
Each of the rods 18—19 is provided where the operating device is to be attached with a sleeve 43, each sleeve being preferably provided with a set screw 44 by which they may be adjustably coupled to the rods.
Each of the sleeves is provided with laterally extending trunnions 45 over which longitudinal slots 46 in an operating lever 47 engage, and each lever is pivoted at 48 intermediate its ends to a bracket 49 attached to the stable structure at a suitable point. The lower free end of the lever arms 47 are each provided with a short section of chain 50 hanging loosely, the free end of the chain being connected in any suitable manner to the stable structure. The chains hang loosely to provide easy means for the attendant to actuate the levers 47. The chains 50 may be conducted through the wall of the stable and be accessible from the exterior as shown in Fig. 2, so that in event of fire the attendant can operate the various rods from the exterior of the barn, as hereafter explained. Each manger will be provided with a separate and individual hitching device, and the hitching devices are so arranged that they are simultaneously released by the movement of the various rods, and this releasing means will now be described. Attached to each manger, preferably against the front wall of the same, is a casing 51 through the lower part of which the lower rods 24—25—26— pass, as shown, and as all of the casings and the mechanism within the same are precisely alike, the description of one will suffice for all, and for the purpose of illustration the casing through which the rod 24 passes is selected. An aperture 52 is formed through each of the mangers opposite one of the casings 51, and this aperture is preferably provided at its outer end with a guard plate 53 to protect the relatively soft material of the manger.

Located within the casing 51 at opposite sides of the aperture 52 are guide rollers 54—55. Connected to each of the rods which passes through the casing 51 is a block 56 having an interior cavity 57 open at one end and with a reduced open slot 58 communicating with the cavity. The hitching device comprises a pin 59, each pin having a link 60 at one end and a laterally enlarged head 61 at the other end, the link being employed to connect the halter strap or rope, while the head of the pin is designed to enter the cavity 57 and the stock 59 of the pin to enter the slot 58. The head 61 is just large enough to pass between the rollers 54—55, and when the rod 24 is moved to its limit in one direction the block 56 will be caused to pass with its cavity 57 beyond the path of the roller 54, so that the head 61 of the pin may be inserted into the path of the cavity 57, and then when the rod 24 is moved to its other position the slot 59 will pass over the stock 59 of the pin and thus lock the pin fast within the casing 51. By this means the heads of stock will be hitched to their individual mangers, and will remain thus hitched until one of the rods 18 or 19 is actuated, as before described. By this arrangement in event of a fire, the attendant by operating one of the actuating levers 47 simultaneously moves each of the rods which pass through the mangers and likewise simultaneously actuates all of the blocks 56 and thus releases all of the pins 59, as will be obvious.

The improved device is simple in construction and can be extended to adapt the device to any number of stalls by simply multiplying the various rods and coupling devices.

What is claimed is:—

1. The combination with stalls for stock, of a rod movable through said stalls, a block carried by said rod and provided with an open recess and an open contracted slot communicating with the recess, guide rollers spaced apart and located adjacent to the path of said block, a pin having halter connecting means at one end and insertible between said guide rollers and an enlargement at the other end, said pin engaging in said slot and said enlarged head engaging in said recess, and means for moving said rod.

2. The combination with stalls for stock, of a casing connected to said stall, a rod movable through said casing, a block carried by said rod and movable within said casing and guided thereby and provided with an open recess and an open contracted slot communicating with the recess, spaced guide rollers located within said casing and adjacent to the path of said block, a pin having halter connecting means at one end and an enlargement at the other end, said pin passing between said rollers and engaging in said recess and means for moving said rod.

In testimony whereof, I affix my signature, in presence of two witnesses.

ELESER KLEMETSON.

Witnesses:
R. R. PATTERSON,
OSCAR KLEMETSON.